(12) United States Patent
Johnson et al.

(10) Patent No.: US 6,692,010 B1
(45) Date of Patent: Feb. 17, 2004

(54) SAFETY SULKY FOR POWER MOWERS

(76) Inventors: Glenn Johnson, 25 Woodside Rd., Robbinsville, NJ (US) 08691; John Pallay, 435 Canal Rd., East Millstone, NJ (US) 08875; Kevin Mak, 136 Crestwood Dr., Warren, NJ (US) 07059

( * ) Notice: Subject to any disclaimer, the term of this patent is extended or adjusted under 35 U.S.C. 154(b) by 29 days.

(21) Appl. No.: 10/079,174

(22) Filed: Feb. 21, 2002

(51) Int. Cl.$^7$ .............................................. B62D 63/00
(52) U.S. Cl. ........................ 280/32.7; 280/78; 280/494
(58) Field of Search ............................... 280/32.7, 492, 280/493, 494, 498, 78, 489, 400, 479.3, 411.1, 447, 166; 172/433, 257

(56) References Cited

U.S. PATENT DOCUMENTS

| | | | | |
|---|---|---|---|---|
| 2,404,362 A | * | 7/1946 | Carlson | 280/492 |
| 2,721,087 A | * | 10/1955 | Pearson | 280/447 |
| 3,099,462 A | * | 7/1963 | Lent | 280/479.3 |
| 3,485,314 A | * | 12/1969 | Herr | 280/32.7 |
| 3,580,612 A | * | 5/1971 | Pearson | 280/492 |
| 4,215,875 A | * | 8/1980 | Younger | 280/479.3 |
| 4,828,282 A | * | 5/1989 | Pinto | 280/32.7 |
| 5,004,251 A |   | 4/1991 | Velke et al. | |
| 5,413,364 A | * | 5/1995 | Hafendorfer | 280/32.7 |
| 5,423,565 A | * | 6/1995 | Smith | 280/411.1 |
| 5,697,623 A | * | 12/1997 | Bermes et al. | 280/32.7 |
| 5,947,490 A | * | 9/1999 | Munnoch et al. | 280/32.7 |
| 6,000,705 A | * | 12/1999 | Velke | 280/32.7 |
| 6,234,495 B1 | * | 5/2001 | Velke | 280/32.7 |

* cited by examiner

*Primary Examiner*—Brian L. Johnson
*Assistant Examiner*—Hau Phan
(74) *Attorney, Agent, or Firm*—Salzman & Levy

(57) ABSTRACT

A safety sulky for a self-propelled mower. The safety sulky has a chamber adjacent a platform upon which a mowing operator stands. Two, spaced-apart pins that are biased downwardly by a spring can be made to rise above the chamber by two levers. The two, spaced-apart, spring-biased pins can project through the upper surface of the chamber by standing on the levers. The pins operatively engage with, and rise adjacent to, the elongated arm thus intersecting the swing path of the sulky about the connecting arm, limiting its arcuate movement.

10 Claims, 7 Drawing Sheets

SAFETY SULKY FOR POWER MOWERS

FIELD OF THE INVENTION

The invention relates to a sulky apparatus for attachment to a self-propelled power mower and, more particularly, to a safety sulky that has limited rotational capability so that the cab of the sulky cannot swing under the arm of the sulky when the mower is caused to reverse or slide and/or translate upon an inclined surface, and/or make sharp turns.

BACKGROUND OF THE INVENTION

In recent times commercial, walk-behind, self-propelled mowers have been built with large and powerful engines and large cutting radii. Commercial landscapers are able to use these machines for mowing a lawn quickly. However, after mowing a plurality of lawns, the operator of the mower often feels tired from all of the walking that has been done in order to accomplish the job.

More recently, a sulky device has been invented which allows the mower operator to ride behind these self-propelled mowers. Such a sulky device is illustrated in U.S. Pat. No. 5,004,251, issued to Velke et al on Apr. 2, 1991, entitled SULKY APPARATUS ATTACHABLE TO A SELF-PROPELLED POWER MOWER. The sulky of this patent is a device that attaches to the rear of a self-propelled power mower via an elongated attachment arm. The sulky comprises a foot-receiving platform upon which stands the operator of the self-propelled power mower. The platform is supported by a wheel that allows the platform and the operator standing thereupon to ride in tandem with the moving mower. The elongated attachment arm connects the sulky platform to the end of the mower at a forward distal end of the arm. The forward attachment comprises a horizontal pivot pin that allows for up and down movement of the arm about the mower.

The arm is attached at its rear distal end to the sulky platform via a vertical pivot pin. The vertical pivot pin allows the sulky platform to rotate through a full turn (i.e., 360 degrees with respect to the attachment arm and mower in an operative mode). The full pivoting rotation allows the sulky platform to fold up under the handlebars of the mower when the mower is moved in reverse or when it is caused to translate sideways on a hill. This can be extremely dangerous because the frame containing the cutting blades of the mower can conceivably ride over the feet of the operator.

The present invention provides a safety sulky that is prevented from making a full, 360° rotational turn with respect to the connecting arm and hence, prevents the mower from riding over the feet of the operator.

The sulky of the present invention comprises a device having a platform for receiving the feet of a mower operator. At least one wheel supports the sulky for movement in tandem with the self-propelled power mower. An elongated arm pivotally attaches the sulky to the self-propelled power mower. The elongated arm has a horizontal pivot at its forward end and a vertical axle pivot at its rear end, which affords only limited motion to the sulky in an operative mode by virtue of a safety device. The safety device comprises a chamber adjacent the platform that contains two spaced-apart pins that are biased downwardly by a spring. The two spaced-apart, spring-biased pins can project through the upper surface of the chamber in order to operatively engage with, and rise adjacent to, the elongated arm.

A pair of levers, one for each foot of the operator, extends through the chamber into the platform area. The operator stands on the levers to activate the two pins that are forced to project upwardly through the upper surface of the chamber against the biasing of the spring. Depressing the levers causes the pins to rise to a height above the chamber where they intersect the swing path of the sulky with respect to the elongated arm. The upwardly projecting pins limit the pivotal movement of the sulky with respect to the elongated arm, such that the sulky cannot pivot in a full circle about the vertical axle pivot. The result is that, should the mower be caused to reverse or translate sideways on a hill, the sulky or the feet of the operator will not pass beneath the elongated arm or mower undercarriage that contains the rotating cutting blades. This safety device prevents possible injury to the operator should the mower reverse direction, slip sideways, or turn sharply.

SUMMARY OF THE INVENTION

In accordance with the present invention there is provided a safety sulky for attachment via an elongated arm to a self-propelled power mower. The arm is horizontally pivotal at a forward distal end and vertically pivotal at its rear distal end where it attaches to the sulky. The safety sulky comprises a foot platform upon which the mower operator can stand. At least one wheel is rotationally fixed to the foot platform such that the sulky with the mower operator standing thereupon can ride along behind the mower. Disposed in front of the foot platform is a chamber containing two spaced-apart pins, which can be operatively projected through the upper surface of the chamber. These pins can be caused to move upwardly against the biasing of a spring to an upward position where they intersect the rotational path of the connecting arm. The pins limit the arcuate movement of the sulky about the connecting arm with respect to the vertical pivot. Two levers extend from the chamber into the platform area. The levers are respectively attached to the spaced-apart pins. The mower operator can stand upon the levers, forcing the pins upwardly against their spring biasing to reach their upper position.

It is an object of this invention to provide an improved sulky for attachment to a self-propelled power mower.

It is another object of the present invention to provide a safety sulky that prevents injury to a mower operator when the self-propelled mower is caused to reverse.

It is a further object of this invention to provide an improved safety sulky that prevents possible injury to a mower operator when sharp turns are made.

BRIEF DESCRIPTION OF THE DRAWINGS

A complete understanding of the present invention may be obtained by reference to the accompanying drawings when considered in conjunction with the subsequent detailed description, in which:

FIG. 3 shows a schematic top, phantom view of the levers of the safety sulky illustrated in FIGS. 1 and 1a.

For purposes of brevity and clarity, like components and elements of the apparatus of this invention will bear the same designations or numbering throughout the figures.

DESCRIPTION OF THE PREFERRED EMBODIMENT

Generally speaking, the invention features a safety sulky for a self-propelled mower. The safety sulky comprises a chamber adjacent to a platform on which a mowing operator stands. Two spaced-apart pins that are biased downwardly by a spring can be made to rise above the chamber by two levers. The two spaced-apart, spring-biased pins can project through the upper surface of the chamber by standing on the levers. The pins operatively engage with, and rise adjacent to, the elongated arm, thus intersecting the swing path of the sulky about the connecting arm, limiting its arcuate movement.

Figure 1:
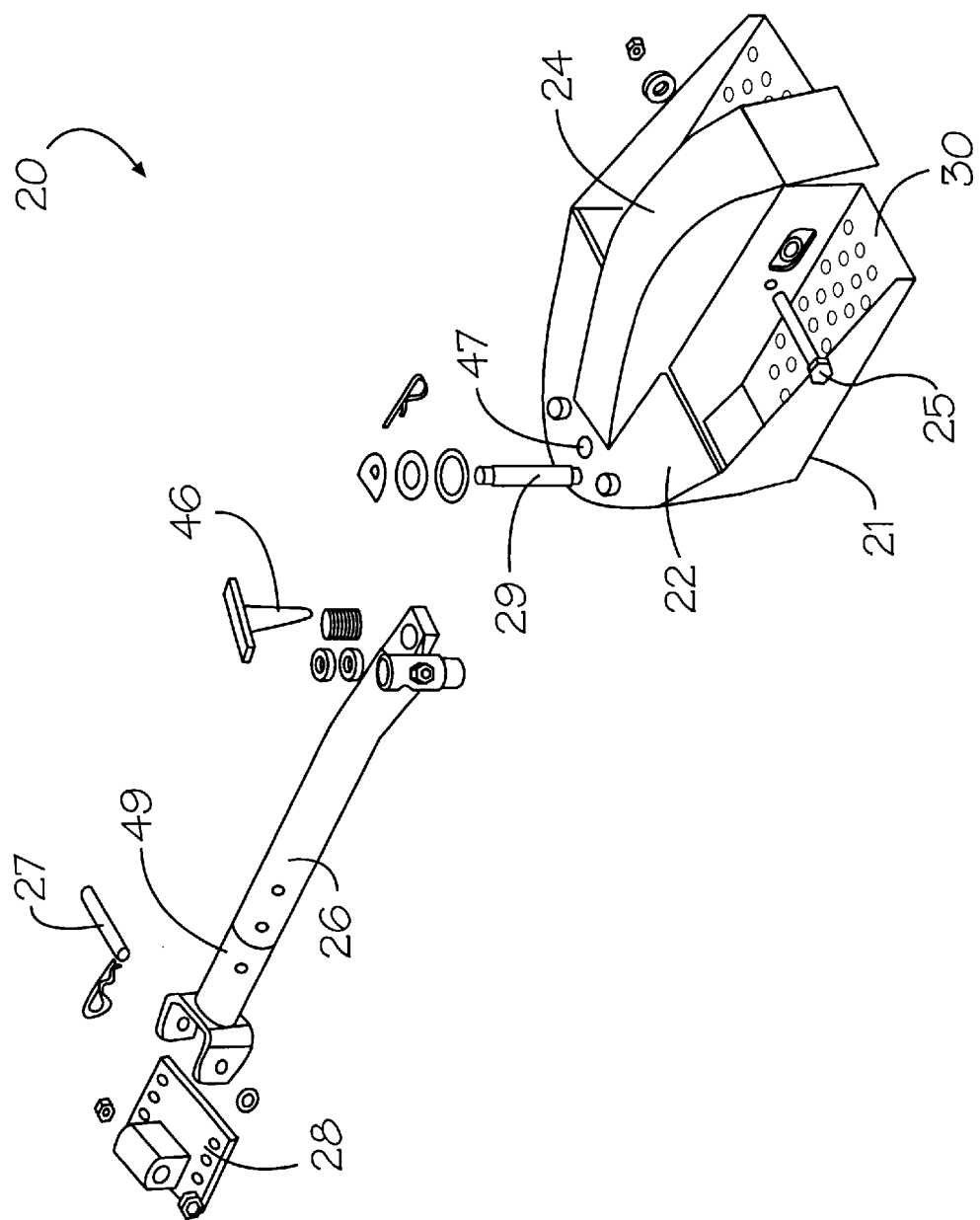
FIG. 1 depicts an exploded perspective view of the safety sulky of the present invention.
Figure 1A:
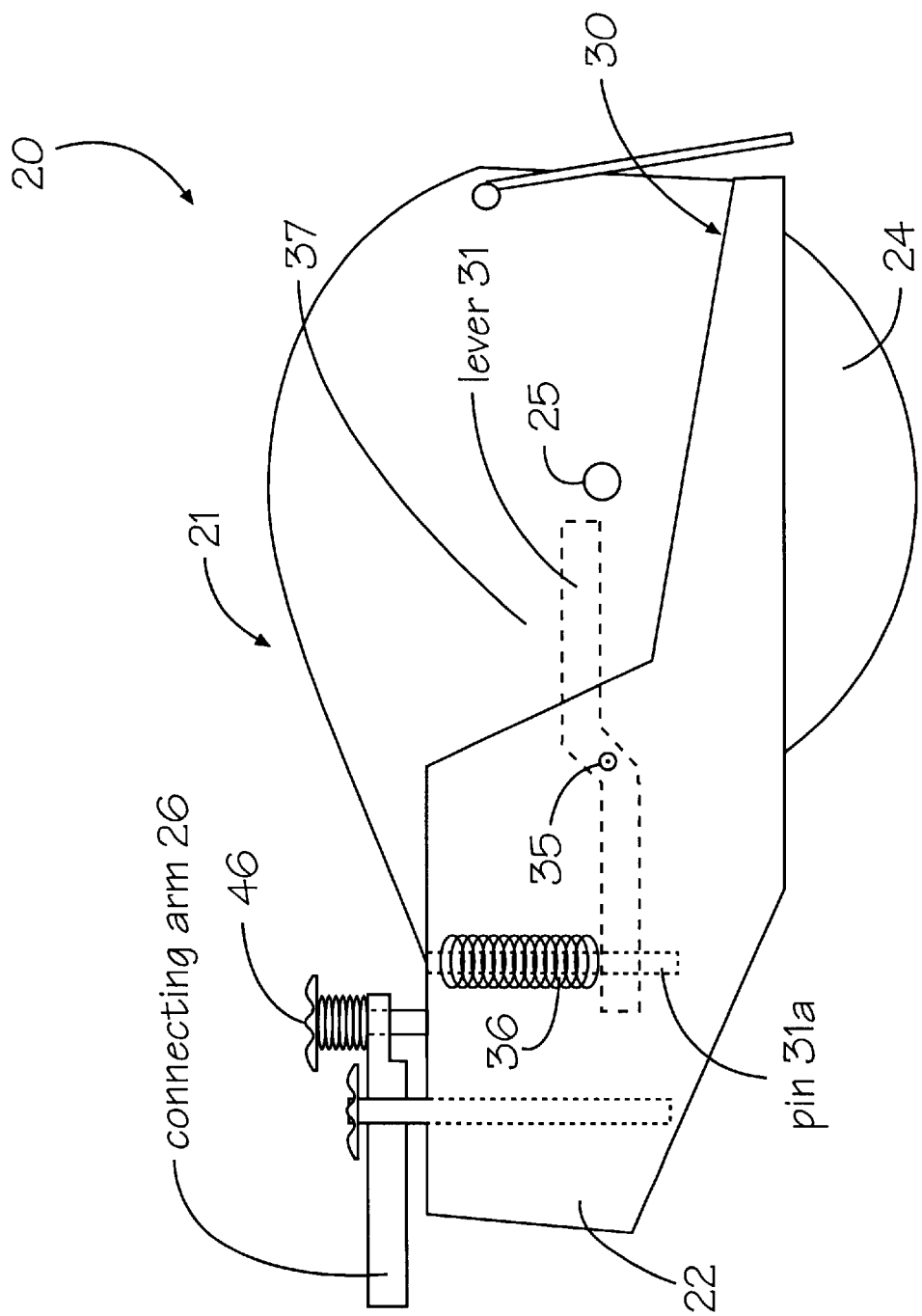
FIG. 1a shows a schematic side view of the safety sulky depicted in FIG. 1 wherein the safety mechanism is in an inoperative position.
Figure 1B:
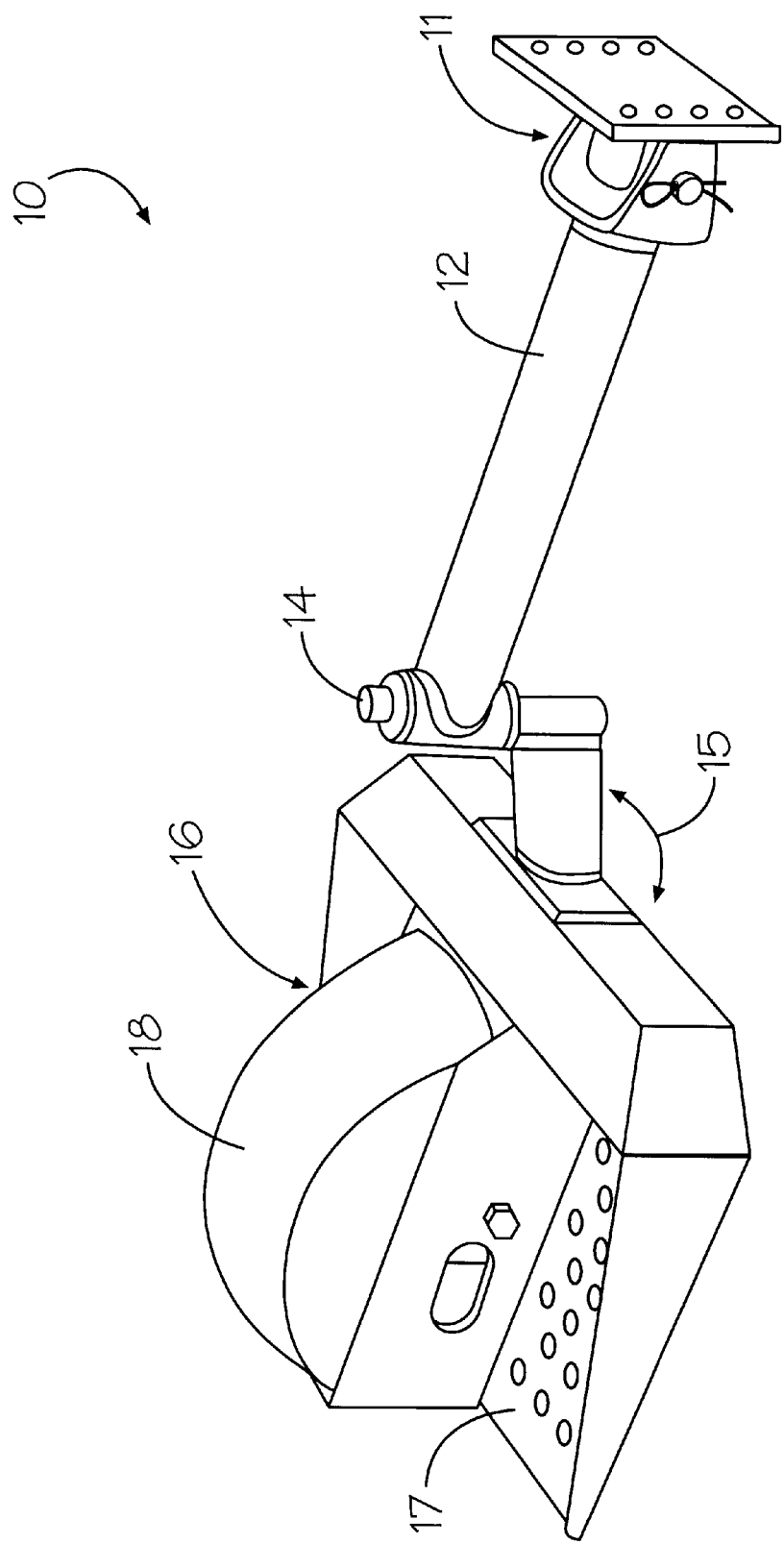
FIG. 1b illustrates a perspective view of the prior art sulky.

Now referring to FIG. 1b, a prior art sulky apparatus 10 is illustrated. The prior art sulky apparatus 10 is attached to a self-propelled, power mower (not shown) at its forward end by a horizontal pivot and face plate 11, via a connecting rod 12. The connecting rod 12 is attached to a sulky cab 16, which is free to rotationally pivot through 360 degrees of rotation (arrows 15) about a vertical axle 14. The sulky cab 16 is designed to allow the mower operator to stand on the sulky platform 17 as the sulky cab 16 is pulled behind the mower. The sulky cab 16 is rotationally affixed to a wheel 18, allowing the sulky cab and mower operator to ride behind the self-propelled power mower.

The rotation of the sulky cab 16 about the vertical axle 14 is unrestricted (360°) such that when the mower is caused to reverse, or when it slides or translates towards the sulky cab 16, the feet of the operator can be swept under the mower undercarriage and into contact with the cutting blades of the mower. This is a very dangerous condition.

Referring to FIG. 1, the safety sulky apparatus 20 of the present invention is shown. The safety sulky apparatus 20 comprises a sulky cab 21 having a forward chamber 22, a foot well platform 30 for receiving the feet of a mower operator, and at least one wheel 24 that is rotationally affixed to the sulky cab 21 via an axle 25.

A connecting arm 26 attaches the sulky cab 21 to a rear section of a self-propelled power mower (not-shown) via a horizontally pivotal axle 27 and faceplate 28 attached to its forward end. The connecting arm 26 attaches to the sulky cab 21 at its rearward end via a vertically-oriented axle 29. The vertically oriented axle 29 is located upon the chamber 22 in proximity to the cot well platform 30, as shown in better detail with reference to FIG. 3.

Figure 3:
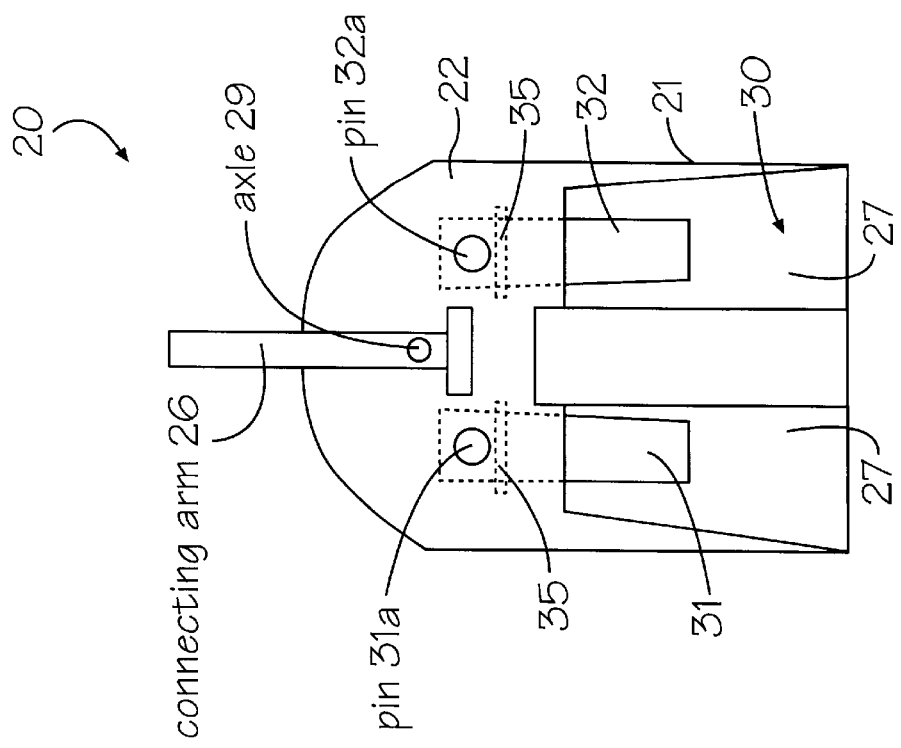

In order to prevent the sulky cab 21 from rotating under the cutting blade carriage of the mower, the safety sulky apparatus 20 of this invention comprises two levers 31 and 32 (FIG. 3). The levers 31 and 32 are attached to respective pins 31a and 32a, as better observed by reference to FIGS. 3 and 1a. Although only one lever 31 and only one pin 31a are shown in FIG. 1a, the operation and structure for lever 32 and pin 32a are the same.

Referring to both FIGS. 1a and 3, the respective levers 31 and 32 are pivotally attached to the sulky cab 21 via axles 35 disposed inside chamber 22. The levers 31 and 32 both extend from the chamber 22 into the foot well platform 30. The levers 31 and 32 are operative when depressed by the respective left and/or right foot of the mower operator, as his feet enter the foot well cavities 37 of platform 30. This can be better observed with reference to FIG. 1c. Each of the pins 31a and 32a is spring-biased downwardly by a spring 36.

OPERATION OF THE SAFETY SULKY

The operation of the inventive safety sulky 20 is explained with reference to FIGS. 1a, 1c, 2a, 2b, and 2c. In the inoperative position, the levers 31 and 32 are in their respective horizontal positions, as shown in FIG. 1a, and the pins 31a and 32a are in their lower position "A," as shown in FIG. 1a. The safety sulky 20 is actuated by depressing the levers 31 and 32, as illustrated in FIG. 1c.

Figure 1C:
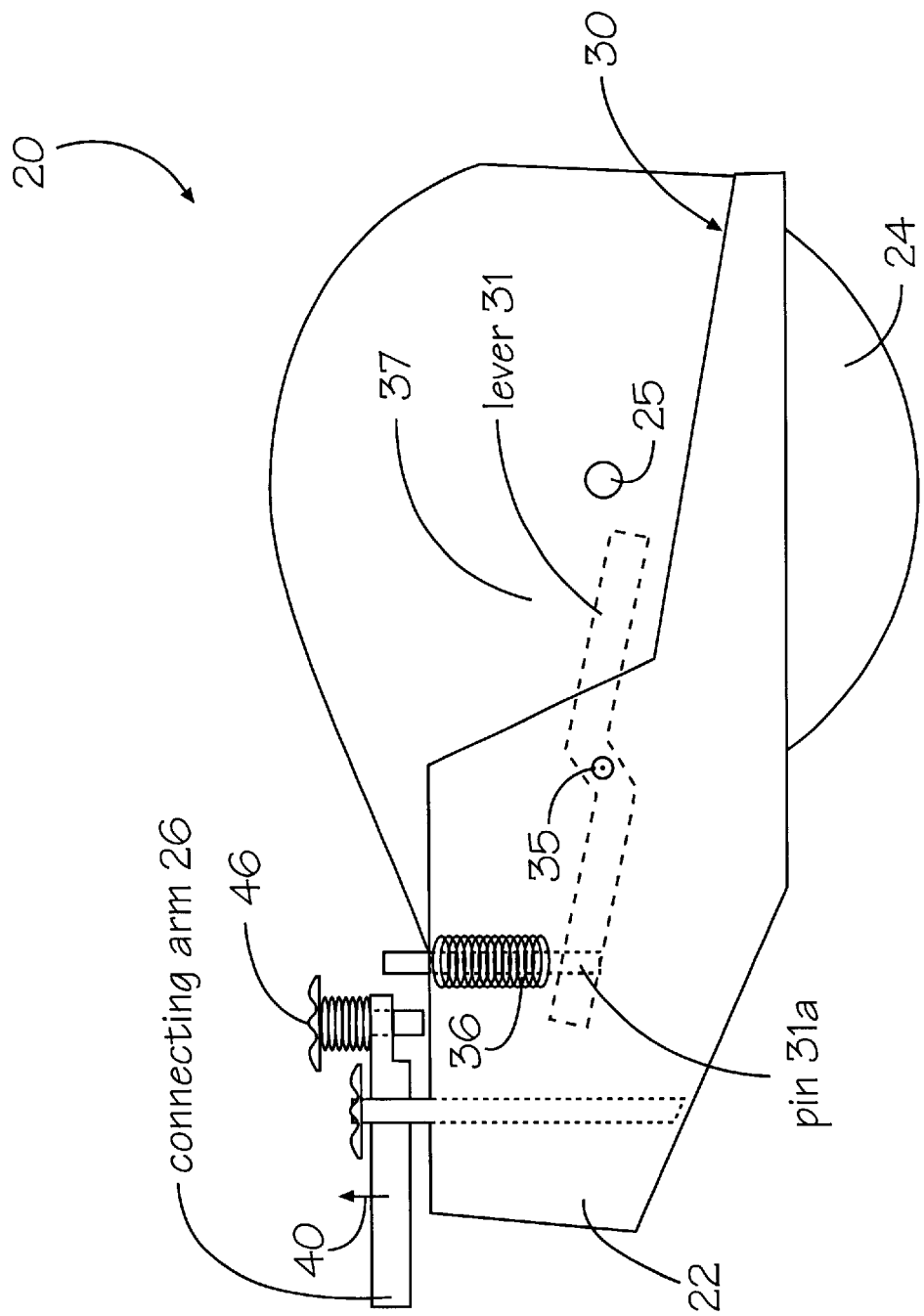
FIG. 1c illustrates a schematic side view of the safety sulky depicted in FIG. 1a wherein the safety mechanism is in an operative position.
Figure 2B:
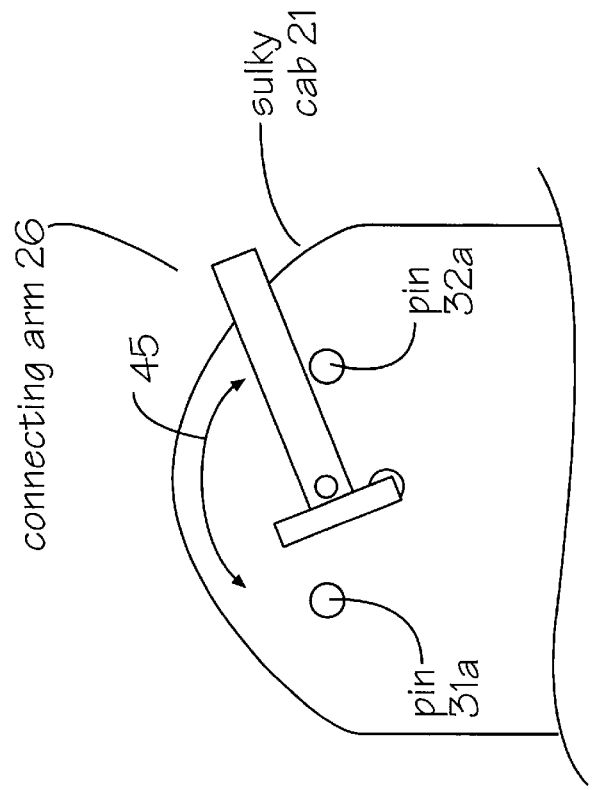
FIGS. 2a through 2c depict schematic partial top views of the sulky illustrated in FIG. 1c with three respective connecting arm positions.
Figure 2A:
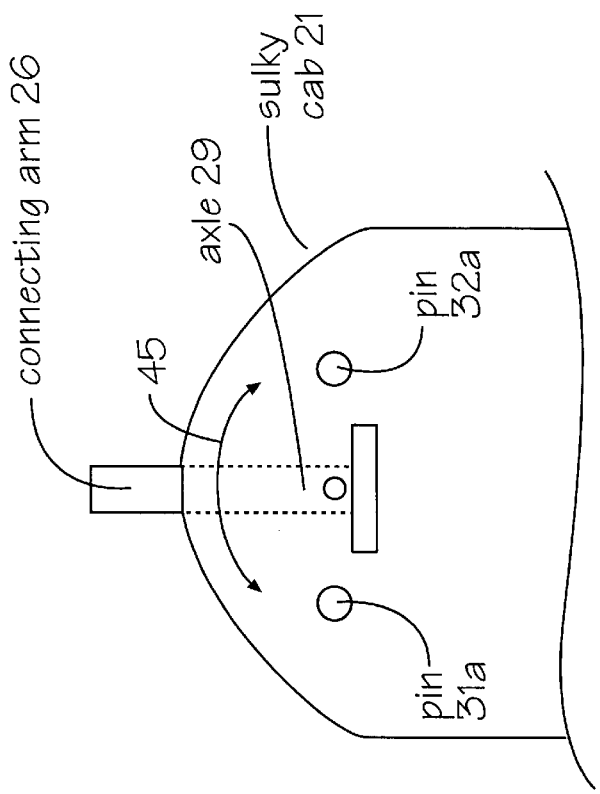
Figure 2C:
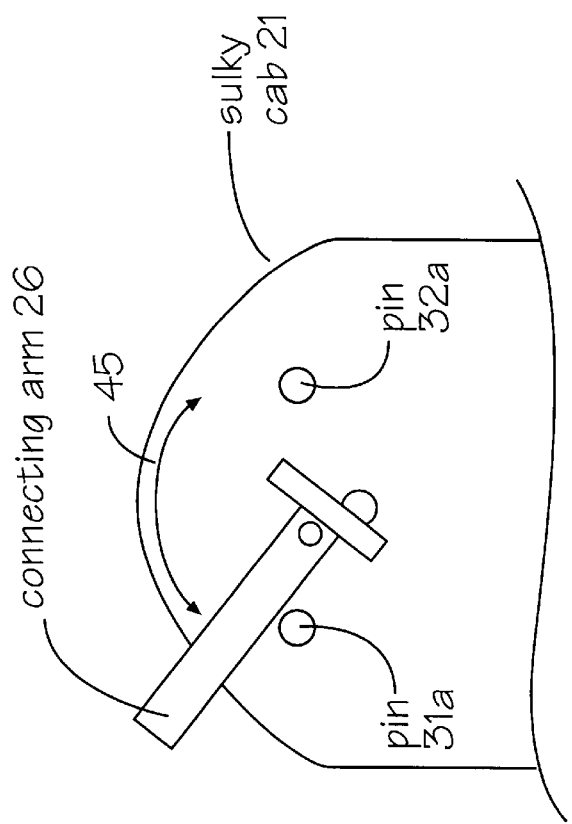

The two spaced-apart pins 31a and 32a are normally biased downwardly to position "A" by spring 36 but can be made to rise above the chamber 22 against the biasing of spring 36 to actuation position "B," by depressing the two levers 31 and 32, as shown in FIG. 1c. The two spaced-apart, spring-biased pins 31a and 32a can project through the upper surface of chamber 22 (arrow 40) by standing on respective levers 31 and 32. The pins operatively engage with, and rise adjacent to, the elongated connecting arm 26, thus intersecting the swing path of the sulky cab 21 about the connecting arm 26, limiting arcuate movement 45 of the sulky cab 21 about the connecting arm 26, as shown in FIGS. 2a, 2b, and 2c and 1c. Thus, when connecting arm 26 is substantially perpendicular to the horizontal axis of cab 21 (FIG. 2a) neither pin 31a nor pin 32a comes into contact with arm 26. But as shown in FIG. 2b when connecting arm 26 is turned clockwise it comes into contact with 32a thereby limiting its arcuate movement 45. Alternately, the arcuate movement 45 of connecting arm 26 is limited by contact with pin 31a when moved counterclockwise as illustrated in FIG. 2c.

Figure 1D:
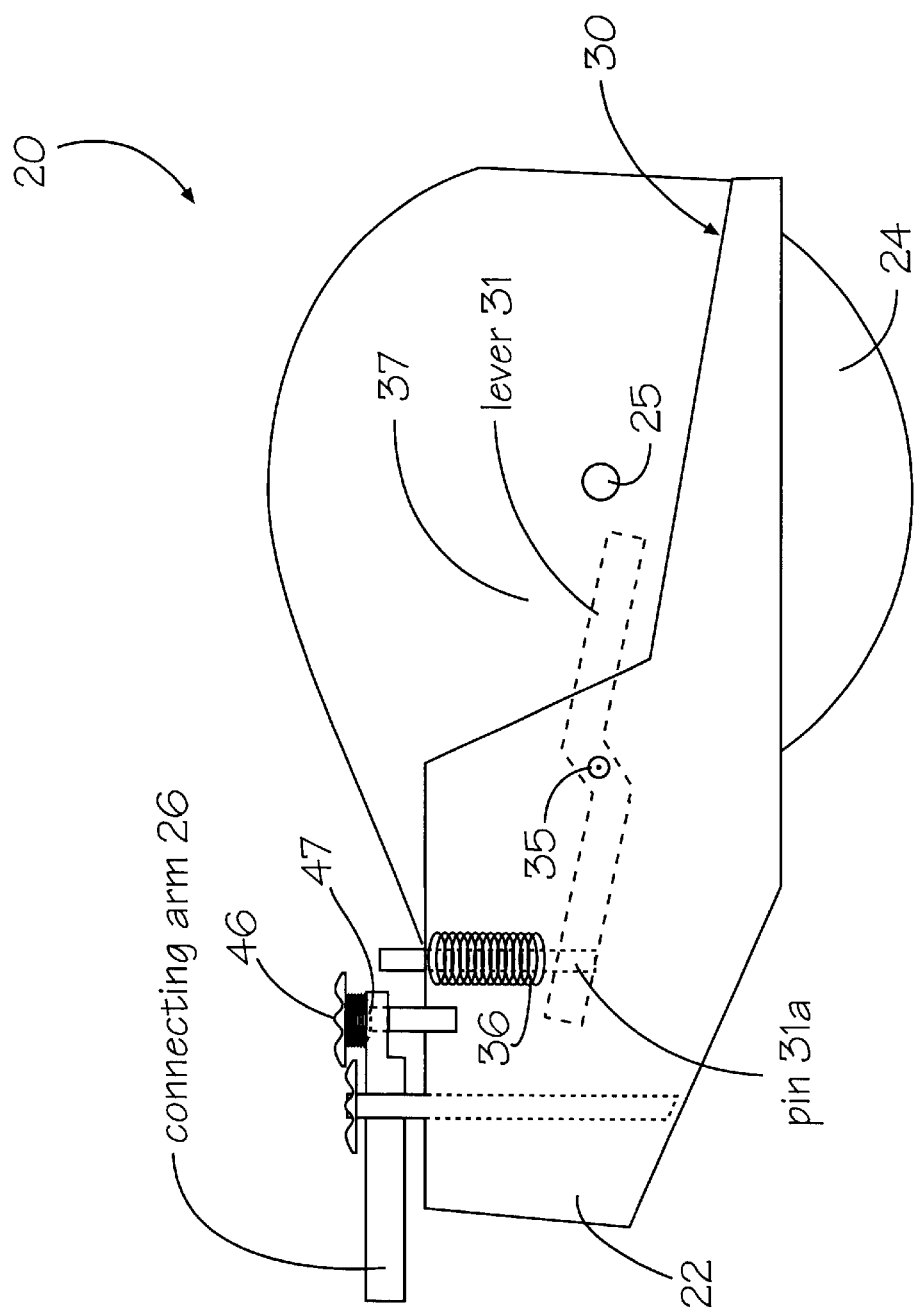
FIG. 1d also depicts a schematic side view of the safety sulky shown in FIG. 1a wherein the safety mechanism is in an operative position and shows the rear alignment pin in action.

FIG. 1d shows a reverse lockout safety feature that allows an operator of the safety sulky 20 to back up the unit, remain standing on the sulky platform 30, and keep the unit traveling in a straight direction without allowing it to pivot underneath itself. This is achieved by using a spring-loaded pin system similar to the one used to limit rotation. This spring-loaded, rear alignment pin 46 is welded to the back or end of the connecting arm 26. The pin assembly has a spring bias that pushes it up. The top of the pin 46 has a pedal on it so the operator can depress the pin 46 into a receiving slot 47 on the sulky cab 21. The pin 46 will be depressed by the operator's toe while the heel will rest on the top of the fender. This will allow the operator to move in reverse without stepping off of the safety sulky 20 or sacrificing the unit.

Since other modifications and changes varied to fit particular operating requirements and environments will be apparent to those skilled in the art, the invention is not considered limited to the example chosen for purposes of, disclosure and covers all changes and modifications which do not constitute departures from the true spirit and scope of this invention.

Having thus described the invention, what is desired to be protected by Letters Patent is presented in the subsequently appended claims.

What is claimed is:

1. A safety sulky for attachment to a self-propelled mower via a connecting arm, comprising:

a sulky platform upon which a mower operator can stand;

support means for supporting said sulky platform for movement behind said self-propelled mower;

a chamber disposed adjacent to said sulky platform;

pivot means carried by said support means, about which said sulky platform and said chamber can pivotally move in an arcuate path with respect to said connecting arm; and a movement limiting apparatus carried by said support means for limiting the arcuate path of said sulky platform and said chamber with respect to said pivot means, said movement limiting apparatus being actuated by said mower operator when standing on said sulky platform, whereby said sulky platform and said chamber do not move pivotally in proximity to said self-propelled mower during a mowing operation.

2. The safety sulky for attachment to a self-propelled mower in accordance with claim 1, wherein said movement limiting means comprises at least one lever and pin combination, said lever being attached to said pin, and causing said pin to move into proximity to said connecting arm in order to restrict a full pivotal movement of said sulky platform and said chamber about said pivot means.

3. The safety sulky for attachment to a self-propelled mower in accordance with claim 2, wherein at least one said lever and pin combination are supported by said chamber, and wherein said lever extends from said chamber into proximity with said sulky platform, whereby said mower operator can stand upon said lever in order to actuate and move said pin from an inoperative position to an actuated position.

4. The safety sulky for attachment to a self-propelled mower in accordance with claim 3, further comprising springs adjacent said lever, wherein said pin is spring-biased towards an inoperative position and said lever moves said pin against a biasing of the springs.

5. The safety sulky for attachment to a self-propelled mower in accordance with claim 2, wherein there are two lever and pin combinations, each of said lever and pin combinations being respectively actuated by a foot of said mower operator.

6. The safety sulky for attachment to a self-propelled mower in accordance with claim 5, wherein said two lever and pin combinations are supported by said chamber and wherein each lever extends from said chamber into proximity with said sulky platform, whereby said mower operator can stand upon each of said levers in order to actuate and move each of said pins from an inoperative position to an actuated position.

7. The safety sulky for attachment to a self-propelled mower in accordance with claim 5, further comprising springs adjacent said lever, wherein each of said pins is spring-biased towards an inoperative position and each of said levers moves each respective pin against a biasing of the springs.

8. The safety sulky for attachment to a self-propelled mower in accordance with claim 1, in combination with a connecting arm.

9. A safety sulky for attachment to a self-propelled mower via a connecting arm, said safety sulky having pivot means disposed on a cab portion for pivotally connecting said safety sulky to said connecting arm, thereby allowing the safety sulky to move pivotally with respect to said connecting arm in an arcuate path, and said safety sulky comprising means for carrying a mower operator for movement behind said self-propelled mower and actuating means disposed adjacent to said pivot means for limiting movement of said safety sulky with respect to said pivot means about said connecting arm.

10. A safety sulky for attachment to a self-propelled mower via a connecting arm, said safety sulky having pivot means disposed on a cab portion for pivotally connecting said safety sulky to said connecting arm, thereby allowing said safety sulky to move pivotally with respect to said connecting arm, said safety sulky comprising means for carrying a mower operator for movement behind said self-propelled mower and actuating means disposed adjacent to said pivot means for limiting pivotal movement of said safety sulky with respect to said pivot means about said connecting arm.

* * * * *